May 19, 1936. T. W. PFIRRMANN 2,041,088
METHOD OF MAKING GRANULATED MATERIALS
Filed June 24, 1933
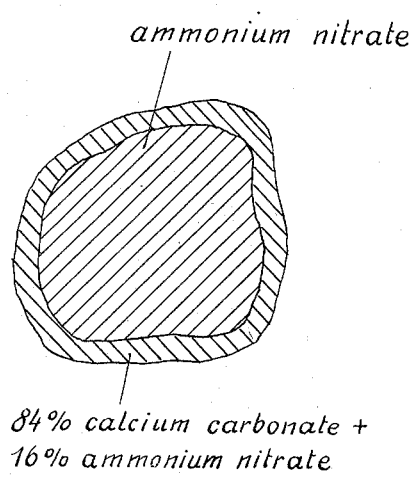
ammonium nitrate
84% calcium carbonate +
16% ammonium nitrate
Inventor:
Theodor Wilhelm Pfirrmann
by Karl Michaelis
Atty.

Patented May 19, 1936

2,041,088

UNITED STATES PATENT OFFICE 2,041,088

METHOD OF MAKING GRANULATED MATERIALS

Theodor Wilhelm Pfirrmann, Castrop-Rauxel, Germany, assignor to Friedrich Uhde Ingenieur-Buro, Dortmund, Germany Application June 24, 1933, Serial No. 677,450
In Germany September 14, 1931

1 Claim. (Cl. 71—9)

My invention relates to the granulating of materials of various kinds, i. e. to the production of such materials in the form of well defined granules of a predetermined particle size, the invention being applicable with particular advantage to the production of simple or mixed fertilizer salts in a granular form in which they can easily be distributed without caking.

The present invention enables me to produce granulated products of well defined, predetermined particle size and shape, which are principally distinguished from the products hitherto produced for similar purposes by the fact that they are composed of two distinct parts intimately connected with each other, viz., a core and a shell surrounding this core and firmly adhering to it.

The core and the shell may be formed of one and the same chemical compound or the like, the difference between the material forming the core and the shell being merely one of physical properties. In the majority of cases, however, the core will consist of one and the shell of another material or compound, however, neither the core nor the shell need be composed of a single constituent, but may be mixtures of different constituents and the shell may for instance contain some of the material constituting the core and vice versa.

Fertilizer products constituted as above described have been found particularly suitable for storage and distribution and to be superior, in this and other respects, to the granulated fertilizer products hitherto on the market.

In the further description of my invention I will now proceed to explain it in its application to fertilizers of a well-known kind, such as for instance the fertilizing compound constituted by ammonium nitrate and calcium carbonate, several varieties of which are already on the market. All these products are composed of mixtures of the two constituents and are substantially uniform in composition throughout their mass. One of these products is made by introducing the finely ground carbonate of lime into molten ammonium nitrate as it comes from the concentration vats, having been produced by the interaction of ammonia and nitric acid. In this composite product the individual particles of carbonate of lime are embedded in the ammonium nitrate, each particle of lime being surrounded by solidified ammonium nitrate which is known to be highly sensitive to the action of moisture so that this composite product will be affected by a moist atmosphere surrounding it substantially in the same manner as pure ammonium nitrate i. e. it will cake during storage to a certain extent and thereby render distribution difficult and uncertain, even though the material may have been granulated, since the superficial layers of ammonium nitrate which envelop each granule, have a tendency to stick together.

In view of these drawbacks it has already been suggested to mix both the ammonium nitrate and the calcium carbonate in the form of dry powders, the mixture being thereafter compressed into tablets. Obviously this process requires the expenditure of considerable compressive energy and in view of the large masses to be compressed into tablets becomes so expensive as to be almost uncommercial.

I avoid these drawbacks by enveloping the ammonium nitrate with a shell of carbonate of lime, thereby avoiding it from coming in contact with and attracting moisture from the air, the envelope or shell which substantially consists of carbonate of lime, being insensitive to the action of moisture.

In actual practice, instead of making the envelope or shell of pure carbonate of lime, I prefer adding a certain quantity of a binder and I have found it useful to use as such binder some nitrate of ammonia, restricting however the quantity of this mixture in such manner that the sensitivity against moisture does not play any role.

In a preferred form of this process I may for instance envelop the ammonium nitrate in a shell containing 84 parts by weight of calcium carbonate and 16 parts ammonium nitrate, which are intimately mixed with each other, the ammonium nitrate in the mixture acting as a binder which glues the particles of calcium carbonate together. As shown by way of example in the accompanying drawing, which shows a section drawn on a greatly enlarged scale each granule thus produced will then consist of a core of substantially pure ammonium nitrate and a shell, surrounding said core, of a mixture of 84 parts calcium carbonate and 16 parts ammonium nitrate, so that the ammonium nitrate core forms 50% of the whole, another 8% ammonium nitrate being contained in the shell or envelope.

Instead of mixing the calcium carbonate with the appropriate proportion of dry powdered ammonium nitrate, I may also add the ammonium nitrate to the calcium carbonate under the form of a solution and in this case I may for instance compose the core of 53 parts ammonium carbonate, while the shell is produced by mixing 42 parts calcium carbonate powder with 10 parts of a 50% ammonium nitrate solution such as is produced in the manufacture of the ammonium nitrate. Obviously the finer the distribution of the lime, the more water will be required in the ammonium nitrate solution, and vice versa.

In producing the shell from dry powdered materials I may grind both the carbonate of lime and the nitrate of ammonia, which may be moist. If the two components are mixed in rotary mixers, the carbonate of lime will envelop the ammonium nitrate, and if the mixture is then dried by the heat supplied to the mixer, the ammonium nitrate in giving off part or all of the water admixed with it, will be converted into a crust acting as a binder.

Obviously a product produced in this manner will show in each granule a well defined core and shell.

The cores are produced by spraying the molten nitrate or by causing same to solidify on cooling drums, on which it will form scales which are then comminuted in any suitable manner and sifted, the granules of proper size being enveloped in shells of calcium carbonate, while the remainder is returned into the melting vats.

Obviously, instead of protecting the ammonium nitrate by an envelope of calcium carbonate, I may also form on the grains of ammonium nitrate shells or envelopes consisting of other protective materials such as for instance aluminum silicate, such as clay, kaoline, ground feldspar or the like.

In a similar manner other products of similar composition may be obtained, the core consisting of one, the shell of another material, the invention being applicable for instance in all cases where salts are recovered in the manufacture under the form of grains, it being however desired to bring the salts on the market with a predetermined standard particle size.

Thus for instance potassium chloride is recovered in a fine grained form, this product containing about 52% $K_2O$, while the commercial potassium chloride on the market commonly contains 40% $K_2O$. In order to produce the latter composition the fine grained potassium chloride has hitherto been mixed with crude potassium chloride containing from about 18 to 30% $K_2O$. However, the crude salt, being recovered in hard lumps, must be ground before mixing it with the fine grained salt.

According to the present invention the crude potassium chloride, as recovered from the rock, is ground to a suitable particle size and the granules thus obtained are enveloped in a shell formed of fine grains of powdered potassium chloride which has been mixed with some mother liquor whereby it is rendered plastic, the grains of natural potassium chloride being embedded in the plastic mass and coated with it. In this manner granules consisting of potassium chloride throughout are obtained which contain the correct percentage of $K_2O$.

I may also add to 100 parts finely ground brown-coal or peat, which has been treated with ammonia, 100 parts diammonium phosphate, 25 parts urea and some water or steam, and in this mixture may be embedded 150 parts granulated potassium chloride or sulfate, the particle size of the potassium salt being chosen in proportion to the desired particle size of the mixed fertilizer.

I thus obtain a granulated mixed fertilizer of brown color, containing humic acid and about 12% N, 18% $P_2O_5$ and 26% $K_2O$.

In a similar manner mixed fertilizers containing ammonium sulfate and ammonium nitrate may be produced, 35% by weight of which are formed of the core of ammonium nitrate, while 60% in the shell are ammonium sulfate to which has been admixed some ammonium nitrate solution to make up for the missing 5% and to act as a binder.

Apart from the fertilizers above described I may also apply my invention to the production of other granulated products and more especially to the production of catalysts or contact substances such as are used in catalytic processes.

I may for instance embed 600 parts of chamotte or bricks of high melting point, which have either been comminuted and sifted to obtain granules of the desired size or which have first been ground, the meal being mixed with water to form a paste, from which granules are formed in a suitable manner, in a mixture formed of 200 parts finely ground zirconium dioxide, 75 parts of a 5% cerium nitrate solution and 2 parts nickel nitrate. The mixture containing the zirconium, cerium and nickel compounds will then form a shell or coating enveloping the chamotte and the composite grains thus obtained are then advantageously treated at about 80° C. on a vibration drier for solidification, drying and rounding. I thus obtain a contact mass having a very large surface and being excellently adapted for reacting methane gas with steam.

In a similar manner other contact masses may be produced which while offering a very large active surface contain comparatively small quantities of the expensive catalyst material.

The vibration driers referred to above are formed of plates superposed in spaced relation, which are enclosed in a casing supplied with hot air or the like and are set vibrating, either individually or in groups or together with the casing, by means of eccentrics, on shafts, to which unbalanced masses are fixed, or in some other suitable manner, either the individual plates or groups of plates or the casing being mounted on or suspended from springs. These plates are vibrated at high frequencies varying from say 1000 to 3000 vibrations per min.

I have described and illustrated such apparatus in a copending application, Serial No. 677,451, filed June 24, 1933, and do not believe it necessary to further describe or illustrate them as they do not form part of the invention above described and claimed in the appended claim.

The mixture or substance to be granulated is first passed through a dividing machine in which it is subdivided into particles of the desired size, which are now introduced into the vibration drier, to be there rounded in contact with the vibrating plates supporting them, from which they will roll down onto the adjoining lower plate, being at the same time deprived of the greater part of the moisture, the rest of the moisture being expelled in a rotary drier of the ordinary kind.

The results obtained, when use is made of the vibration drier described in my acknowledged copending application, are quite superior to those obtained in the usual rotary drier. In my vibration drier a high frequency vibration is imparted to the granules which is of such nature that the particles are thrown free from the drying shelves and a slight rotary motion is simultaneously imparted to them. Thus, the particles can be made to roll in one direction or the other along the shelves in accordance with the direction of rotation of the vibrating shafts. This rolling motion is highly effective in rounding the particles and the repeated striking of the shelves by the particles serves to compact the granule itself as well as to form and compress the outer shells upon the granules. When the granules are free from the shelves they are exposed to the dehydrating action upon all sides. The particular motion imparted to the granules also prevents agglomeration of the individual granules.

Various changes may be made in the details disclosed in the foregoing specification without departing from the invention or sacrificing the advantages thereof.

I claim:

In the manufacture of rounded coated granules, the process which comprises forming the material to be coated into granules of substantially uniform size, passing said granules in the presence of a binding medium and in admixture with a coating material in powder form along the surfaces of a plate while heating said granules and simultaneously vibrating said plate at high frequency in such fashion that said granules are thrown free from said plate and then dropped thereon, thereby compressing said coating material into firmly adherent shells surrounding said granules and producing rounded coated granules.

THEODOR WILHELM PFIRRMANN.